United States Patent
Hendry et al.

(10) Patent No.: US 11,956,443 B2
(45) Date of Patent: Apr. 9, 2024

(54) IMAGE ENCODING/DECODING METHOD AND DEVICE FOR SIGNALING HLS, AND COMPUTER-READABLE RECORDING MEDIUM IN WHICH BITSTREAM IS STORED

(71) Applicant: LG ELECTRONICS INC., Seoul (KR)

(72) Inventors: Hendry Hendry, Seoul (KR); Seung Hwan Kim, Seoul (KR); Seethal Paluri, Seoul (KR); Jie Zhao, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/916,452

(22) PCT Filed: Mar. 26, 2021

(86) PCT No.: PCT/KR2021/003787
§ 371 (c)(1),
(2) Date: Sep. 30, 2022

(87) PCT Pub. No.: WO2021/201515
PCT Pub. Date: Oct. 7, 2021

(65) Prior Publication Data
US 2023/0199191 A1 Jun. 22, 2023

Related U.S. Application Data

(60) Provisional application No. 63/004,490, filed on Apr. 2, 2020.

(51) Int. Cl.
*H04N 19/136* (2014.01)
*H04N 19/103* (2014.01)
(Continued)

(52) U.S. Cl.
CPC ........ *H04N 19/136* (2014.11); *H04N 19/103* (2014.11); *H04N 19/186* (2014.11); *H04N 19/70* (2014.11); *H04N 19/82* (2014.11)

(58) Field of Classification Search
CPC .................... H04N 19/136; H04N 19/103
See application file for complete search history.

(56) References Cited

U.S. PATENT DOCUMENTS

| 2022/0070484 A1* | 3/2022 | Zhao | H04N 19/119 |
| 2023/0027478 A1* | 1/2023 | Deng | H04N 19/139 |
| 2023/0058538 A1* | 2/2023 | Deng | H04N 19/117 |

FOREIGN PATENT DOCUMENTS

WO 2019190181 A1 10/2019

OTHER PUBLICATIONS

Yu-Chiao Yang et al., "AHG17: On LMCS Signalling", Foxconn, Joint Video Experts Team (JVET) of ITU-T SG 16 WP 3 and ISO/IEC JTC 1/SC 29/WG 11, 16th Meeting: Geneva, CH, Oct. 1-11, 2019, Document: JVET-P0497, pp. 1-5.
(Continued)

*Primary Examiner* — Jerry T Jean Baptiste
(74) *Attorney, Agent, or Firm* — Bryan Cave Leighton Paisner LLP

(57) ABSTRACT

An image encoding/decoding method and apparatus for signaling a high level syntax (HLS) and a method of transmitting a bitstream are provided. An image decoding method according to the present disclosure may include obtaining first information indicating whether to constrain luma mapping with chroma scaling (LMCS), obtaining second information indicating whether LMCS for a current video sequence is allowed, and reconstructing a current picture within the current video sequence based on the second information. A value of the second information may be determined based on a value of the first information.

3 Claims, 8 Drawing Sheets

| picture_header_structure( ) { | Descriptor |
|---|---|
| ... | |
|   if( sps_lmcs_enabled_flag ) { | |
|     ph_lmcs_enabled_flag | u(1) |
|     if( ph_lmcs_enabled_flag ) { | |
|       ph_lmcs_aps_id | u(2) |
|       if( ChromaArrayType != 0 ) | |
|         ph_chroma_residual_scale_flag | u(1) |
|     } | |
|   } | |
| ... | |
| } | |

(51) Int. Cl.
   *H04N 19/186*   (2014.01)
   *H04N 19/70*    (2014.01)
   *H04N 19/82*    (2014.01)

(56) References Cited

OTHER PUBLICATIONS

Chen-Yen Lai, et al., "AHG9: Allowing slice-level scaling list and LMCS", MediaTek Inc., Joint Video Experts Team (JVET) of ITU-T SG 16 WP 3 and ISO/IEC JTC 1/SC 29/WG 11, 17th Meeting: Brussels, BE, Jan. 7-17, 2020, Document: JVET-Q0182-v1, pp. 1-5, See pp. 1-4.

Benjamin Bross et al., "Versatile Video Coding (Draft 8)", Editors, Joint Video Experts Team (JVET) of ITU-T SG 16 WP 3 and ISO/IEC JTC 1/SC 29/WG 11, 17th Meeting: Brussels, BE, Jan. 7-17, 2020, Document: JVET-Q2001-vE, 515 pages, See pp. 7.3.2.3, 7.3.3.2 and 8.7.5.1.

Jie Zhao et al., "AHG16/AHG17: LMCS related clean-ups", Dolby Laboratories, Inc. and LG Electronics, Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O0428-V2, pp. 1-4, See pp. 1-3.

\* cited by examiner

| general_constraint_info( ) { | Descriptor |
|---|---|
| ... | |
| no_lmcs_constraint_flag | u(1) |
| ... | |
| } | |

| picture_header_structure( ) { | Descriptor |
|---|---|
| ... | |
|   if( sps_lmcs_enabled_flag ) { | |
|     ph_lmcs_enabled_flag | u(1) |
|     if( ph_lmcs_enabled_flag ) { | |
|       ph_lmcs_aps_id | u(2) |
|       if( ChromaArrayType != 0 ) | |
|         ph_chroma_residual_scale_flag | u(1) |
|     } | |
|   } | |
| ... | |
| } | |

IMAGE ENCODING/DECODING METHOD AND DEVICE FOR SIGNALING HLS, AND COMPUTER-READABLE RECORDING MEDIUM IN WHICH BITSTREAM IS STORED

CROSS-REFERENCE TO RELATED APPLICATION

This application is the National Stage filing under 35 U.S.C. 371 of International Application No. PCT/KR2021/003787, filed on Mar. 26, 2021, which claims the benefit of U.S. Provisional Application No. 63/004,490, filed on Apr. 2, 2020, the contents of which are all hereby incorporated by reference herein in their entirety.

TECHNICAL FIELD

The present disclosure relates to an image encoding/decoding method and apparatus and, more particularly, to an image encoding/decoding method and apparatus for signaling a high level syntax (HLS) and a computer-readable recording medium storing a bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

Another object of the present disclosure is to provide an image encoding/decoding method and apparatus for improving encoding/decoding efficiency by efficiently signaling a HLS.

Another object of the present disclosure is to provide a method of transmitting a bitstream generated by an image encoding method or apparatus according to the present disclosure.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure.

The technical problems solved by the present disclosure are not limited to the above technical problems and other technical problems which are not described herein will become apparent to those skilled in the art from the following description.

Technical Solution

An image decoding method performed by an image decoding apparatus according to an aspect of the present disclosure may comprise obtaining first information indicating whether to constrain luma mapping with chroma scaling (LMCS), obtaining second information indicating whether LMCS for a current video sequence is allowed, and reconstructing a current picture within the current video sequence based on the second information. A value of the second information may be determined based on a value of the first information.

In the image decoding method of the present disclosure, based on that the first information has a value indicating that LMCS is constrained, the second information may have a value indicating that LMCS for the current video sequence is not allowed.

In the image decoding method of the present disclosure, the first information may be obtained from a syntax structure for signaling general constraint information.

In the image decoding method of the present disclosure, the second information may be obtained from a sequence parameter set (SPS).

An image decoding apparatus according to another aspect of the present disclosure may comprise a memory and at least one processor. The at least processor may be configured to obtain first information indicating whether to constrain luma mapping with chroma scaling (LMCS), to obtain second information indicating whether LMCS for a current video sequence is allowed, and to reconstruct a current picture within the current video sequence based on the second information. A value of the second information may be determined based on a value of the first information.

An image encoding method performed by an image encoding apparatus according to another aspect of the present disclosure may comprise encoding first information indicating whether to constrain luma mapping with chroma scaling (LMCS), encoding second information indicating whether LMCS for a current video sequence is allowed, and encoding a current picture within the current video sequence based on the second information. A value of the second information may be determined based on a value of the first information.

In the image encoding method of the present disclosure, based on that the first information has a value indicating that LMCS is constrained, the second information may have a value indicating that LMCS for the current video sequence is not allowed.

In the image encoding method of the present disclosure, the first information may be encoded in a syntax structure for signaling general constraint information.

In the image encoding method of the present disclosure, the second information may be encoded in a sequence parameter set (SPS).

A transmission method according to another aspect of the present disclosure may transmit the bitstream generated by the image encoding apparatus or the image encoding method of the present disclosure.

A computer-readable recording medium according to another aspect of the present disclosure may store the bitstream generated by the image encoding apparatus or the image encoding method of the present disclosure.

The features briefly summarized above with respect to the present disclosure are merely exemplary aspects of the detailed description below of the present disclosure, and do not limit the scope of the present disclosure.

Advantageous Effects

According to the present disclosure, it is possible to provide an image encoding/decoding method and apparatus with improved encoding/decoding efficiency.

Also, according to the present disclosure, it is possible to provide an image encoding/decoding method and apparatus for improving encoding/decoding efficiency by efficiently signaling a high level syntax (HLS).

Also, according to the present disclosure, it is possible to provide a method of transmitting a bitstream generated by an image encoding method or apparatus according to the present disclosure.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

MODE FOR INVENTION

Figure 1:
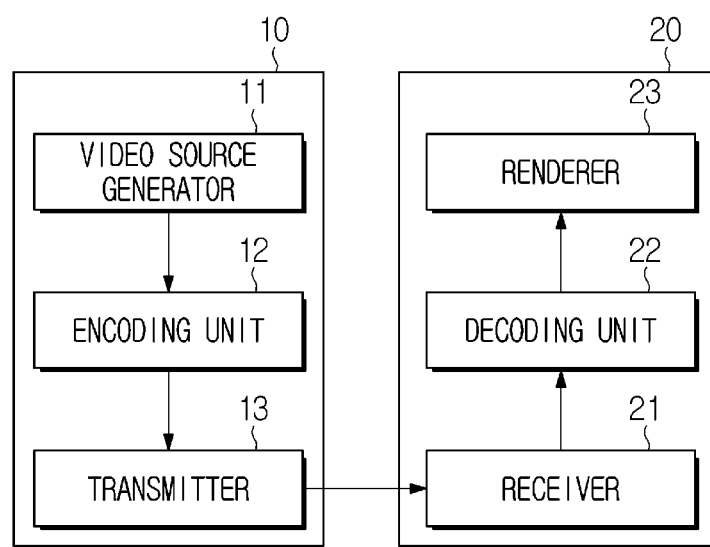
FIG. 1 is a view schematically showing a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "picture" generally refers to a unit representing one image in a specific time period, and a slice/tile is a coding unit constituting a part of a picture, and one picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean a block including both a luma component block and a chroma component block or "a luma block of a current block" unless explicitly stated as a chroma block. The "luma block of the current block" may be expressed by including an explicit description of a luma component block, such as "luma block" or "current luma block". The "chroma block of the current block" may be expressed by including an explicit description of a chroma component block, such as "chroma block" or "current chroma block".

In the present disclosure, "A or B" may mean "only A", "only B" or "both A and B". In other words, in the present disclosure, "A or B" may be interpreted as "A and/or B". For example, in the present disclosure, "A, B or C" may mean "only A, "only B", "only C" or "any combination of A, B and C".

A slash (/) or comma used in the present disclosure may mean "and/or". For example, "A/B" may mean "A and/or B". Therefore, "A/B" may mean "only A", "only B" or "both A and B". For example, "A, B, C" may mean "A, B or C".

In the present disclosure, "at least one of A and B" may mean "only A", "only B" or "both A and B". In addition, in the disclosure, "at least one of A or B" or "at least one of A and/or B" may be interpreted as being the same as "at least one of A and B".

In addition, in the present disclosure, "at least one of A, B and C" may mean "only A", "only B", "only C" or "any combination of A, B and C". In addition, in the disclosure, "at least one of A, B or C" or "at least one of A, B and/or C" may be interpreted as being the same as "at least one of A, B and C".

In addition, parentheses used in the present disclosure may mean "for example". Specifically, when "prediction (intra prediction)" is described, "intra prediction" may be proposed as an example of "prediction". In other words, "prediction" of the present disclosure is not limited to "intra prediction" and "intra prediction" may be proposed as an example of "prediction". In addition, even when "prediction (that is, intra prediction)" is described, "intra prediction" may be proposed as an example of "prediction".

In the present disclosure, technical features individually described in one drawing may be implemented individually or simultaneously.

Overview of Video Coding System

FIG. 1 is a view showing a video coding system according to the present disclosure.

The video coding system according to an embodiment may include a encoding apparatus 10 and a decoding apparatus 20. The encoding apparatus 10 may deliver encoded video and/or image information or data to the decoding apparatus 20 in the form of a file or streaming via a digital storage medium or network.

The encoding apparatus 10 according to an embodiment may include a video source generator 11, an encoding unit 12 and a transmitter 13. The decoding apparatus 20 according to an embodiment may include a receiver 21, a decoding unit 22 and a renderer 23. The encoding unit 12 may be called a video/image encoding unit, and the decoding unit 22 may be called a video/image decoding unit. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may transmit the encoded video/image information or data output in the form of a bitstream to the receiver 21 of the decoding apparatus 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
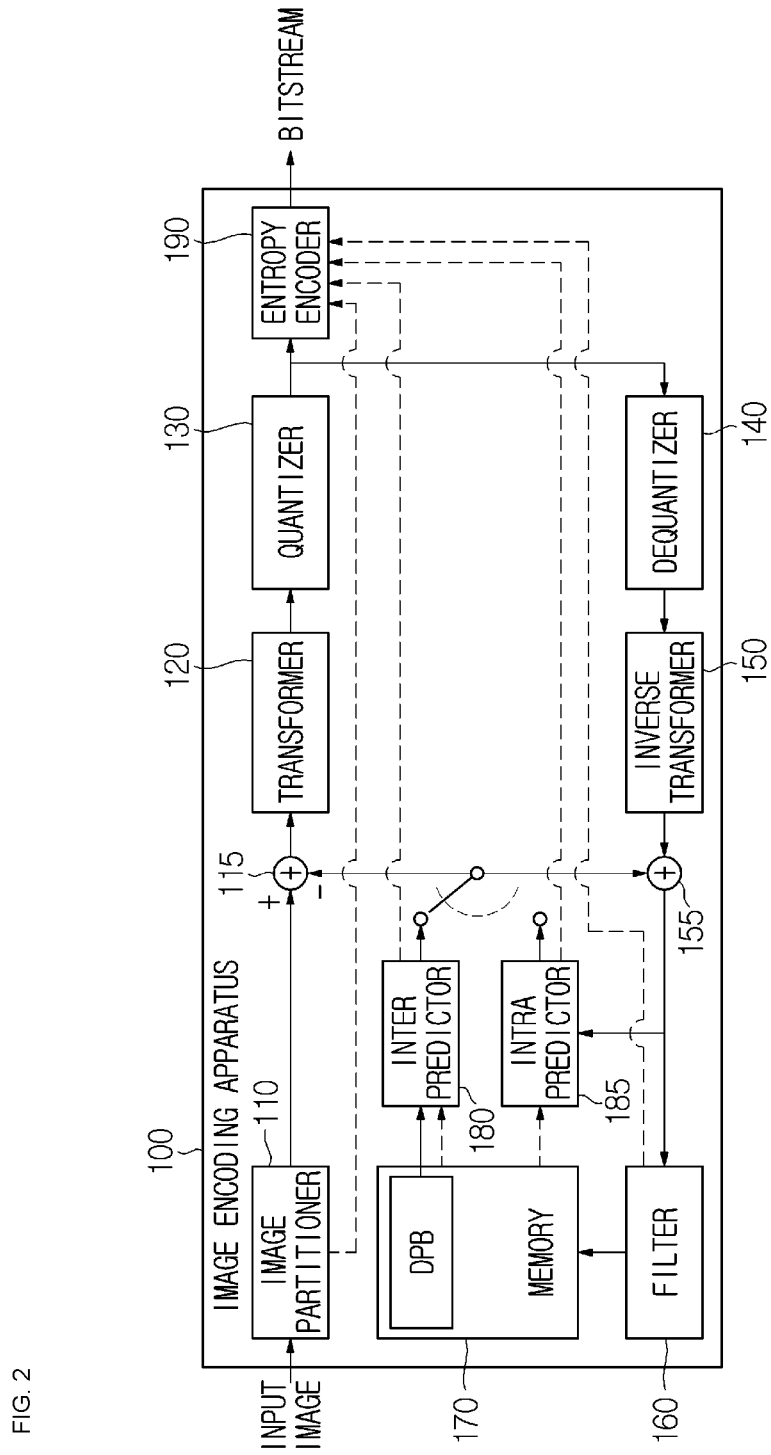
FIG. 2 is a view schematically showing an image encoding apparatus, to which an embodiment of the present disclosure is applicable.

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter predictor 180, an intra predictor 185 and an entropy encoder 190. The inter predictor 180 and the intra predictor 185 may be collectively referred to as a "predictor". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The predictor (the inter predictor 180 or the intra predictor 185) may perform prediction on a block to be processed (current block) and generate a predicted block including prediction samples for the current block. The predictor may determine whether intra prediction or inter prediction is applied on a current block or CU basis. The predictor may generate various information related to prediction of the current block and transmit the generated information to the entropy encoder 190. The information on the prediction may be encoded in the entropy encoder 190 and output in the form of a bitstream.

The intra predictor 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 185 may determine the prediction mode applied to the current block by using a prediction mode applied to a neighboring block.

The inter predictor 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter predictor 180 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The predictor may generate a prediction signal based on various prediction methods and prediction techniques described below. For example, the predictor may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the predictor may perform intra block copy (IBC) for prediction of the current block. Intra block copy may be used for content video/image coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the predictor may be used to generate a reconstructed signal or to generate a residual signal. The subtractor 115 may generate a residual signal (residual block or residual sample array) by subtracting the prediction signal (predicted block or prediction sample array) output from the predictor from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block type into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter predictor 180 or the intra predictor 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

Meanwhile, in a picture encoding and/or reconstruction process, luma mapping with chroma scaling (LMCS) may be applied.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter predictor 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter predictor 180. The memory 170 may store the motion information of the block from which the motion information in the current picture is derived (or encoded) and/or the motion information of the blocks in the picture that have already been reconstructed. The stored motion information may be transmitted to the inter predictor 180 and used as the motion information of the spatial neighboring block or the motion information of the temporal neighboring block. The memory 170 may store reconstructed samples of reconstructed blocks in the current picture and may transfer the reconstructed samples to the intra predictor 185.

Overview of Image Decoding Apparatus

Figure 3:
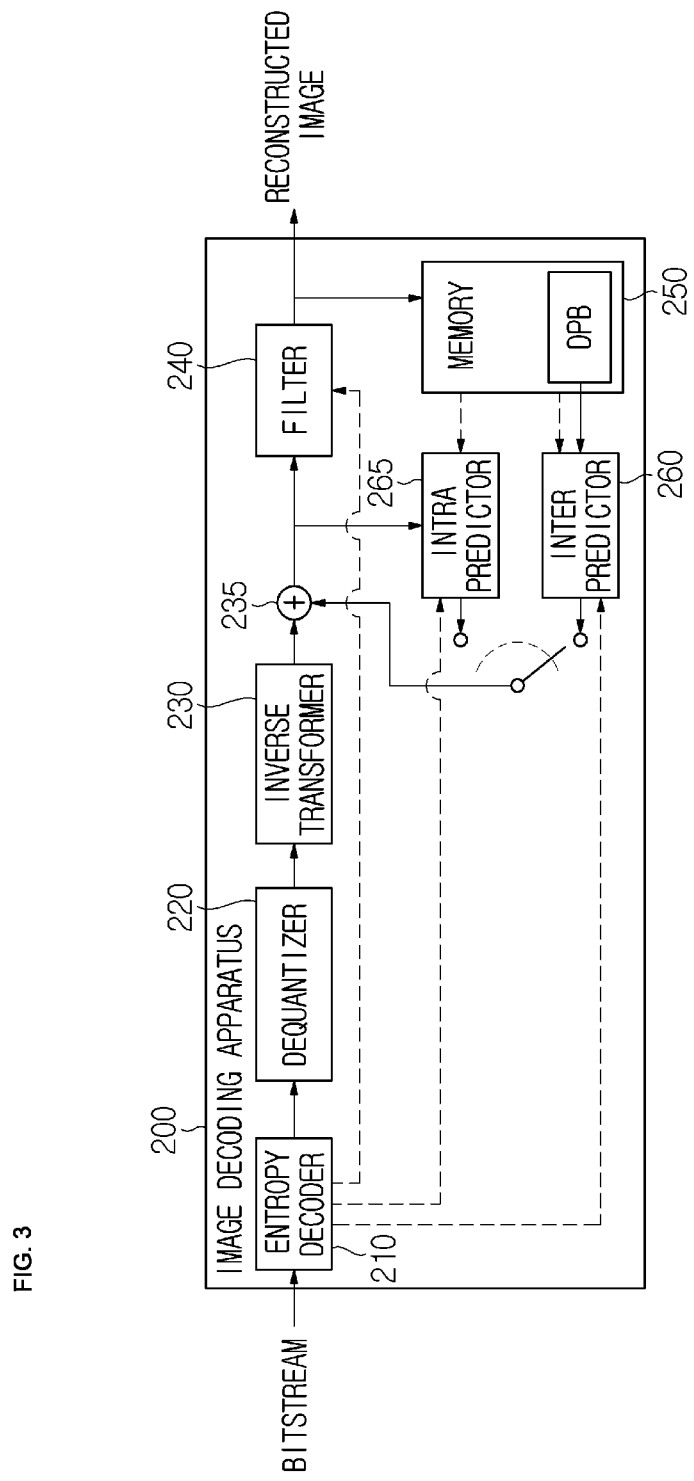
FIG. 3 is a view schematically showing an image decoding apparatus, to which an embodiment of the present disclosure is applicable.

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter predictor 260 and an intra predictor 265. The inter predictor 260 and the intra predictor 265 may be collectively referred to as a "predictor". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 250 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the predictor (the inter predictor 260 and the intra predictor 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter predictor 160 or the intra predictor 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 210 and may determine a specific intra/inter prediction mode (prediction technique).

It is the same as described in the predictor of the image encoding apparatus 100 that the predictor may generate the prediction signal based on various prediction methods (techniques) which will be described later.

The intra predictor 265 may predict the current block by referring to the samples in the current picture. The description of the intra predictor 185 is equally applied to the intra predictor 265.

The inter predictor 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the predictor (including the inter predictor 260 and/or the intra predictor 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

Meanwhile, in a picture decoding process, luma mapping with chroma scaling (LMCS) may be applied.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter predictor 260. The memory 250 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 250 may store reconstructed samples of reconstructed blocks in the current picture and transfer the reconstructed samples to the intra predictor 265.

In the present disclosure, the embodiments described in the filter 160, the inter predictor 180, and the intra predictor 185 of the image encoding apparatus 100 may be equally or correspondingly applied to the filter 240, the inter predictor 260, and the intra predictor 265 of the image decoding apparatus 200.

General Video/Image Coding Procedure

In video/image coding, a picture configuring an video/image may be encoded/decoded according to a decoding order. A picture order corresponding to an output order of the decoded picture may be set differently from the decoding order, and, based on this, not only forward prediction but also backward prediction may be performed during inter prediction.

Figure 4:
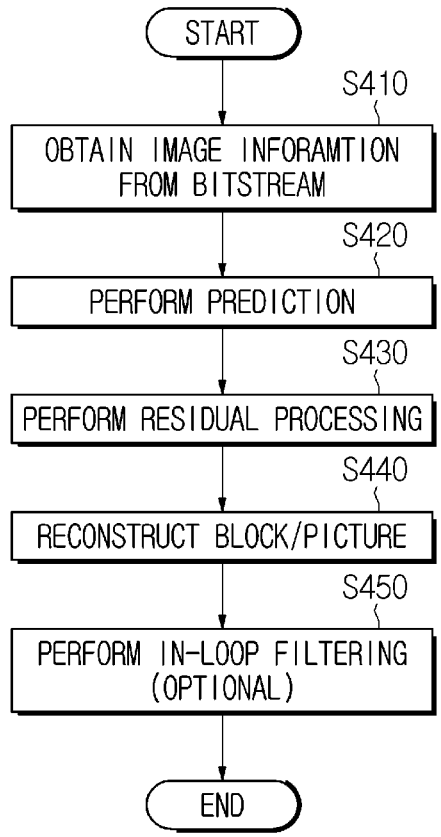
FIG. 4 is a view showing an example of a schematic picture decoding procedure, to which embodiment(s) of the present disclosure is applicable.

FIG. 4 shows an example of a schematic picture decoding procedure, to which embodiment(s) of the present disclosure is applicable.

Each procedure shown in FIG. 4 may be performed by the image decoding apparatus of FIG. 3. For example, step S410 may be performed by the entropy decoder 210, step S420 may be performed by a predictor including the predictors 265 and 260, step S430 may be performed by a residual processor 220 and 230, step S440 may be performed by the adder 235, and step S450 may be performed by the filter 240. Step S410 may include the information decoding procedure described in the present disclosure, step S420 may include the inter/intra prediction procedure described in the present disclosure, step S430 may include a residual processing procedure described in the present disclosure, step S440 may include the block/picture reconstruction procedure described in the present disclosure, and step S450 may include the in-loop filtering procedure described in the present disclosure.

Referring to FIG. 4, the picture decoding procedure may schematically include a procedure (S410) for obtaining video/image information (through decoding) from a bitstream, a picture reconstruction procedure (S420 to S440) and an in-loop filtering procedure (S450) for a reconstructed picture. The picture reconstruction procedure may be performed based on prediction samples and residual samples obtained through inter/intra prediction (S420) and residual processing (S430) (dequantization and inverse transform of the quantized transform coefficient) described in the present disclosure. A modified reconstructed picture may be generated through the in-loop filtering procedure for the reconstructed picture generated through the picture reconstruction procedure. In this case, the modified reconstructed picture may be output as a decoded picture, stored in a decoded picture buffer (DPB) of a memory 250 and used as a reference picture in the inter prediction procedure when decoding the picture later. The in-loop filtering procedure (S450) may be omitted. In this case, the reconstructed picture may be output as a decoded picture, stored in a DPB of a memory 250, and used as a reference picture in the inter prediction procedure when decoding the picture later. The in-loop filtering procedure (S450) may include a deblocking filtering procedure, a sample adaptive offset (SAO) procedure, an adaptive loop filter (ALF) procedure and/or a bi-lateral filter procedure, as described above, some or all of which may be omitted. In addition, one or some of the deblocking filtering procedure, the sample adaptive offset (SAO) procedure, the adaptive loop filter (ALF) procedure and/or the bi-lateral filter procedure may be sequentially applied or all of them may be sequentially applied. For example, after the deblocking filtering procedure is applied to the reconstructed picture, the SAO procedure may be performed. Alternatively, after the deblocking filtering procedure is applied to the reconstructed picture, the ALF procedure may be performed. This may be similarly performed even in the encoding apparatus.

Figure 5:
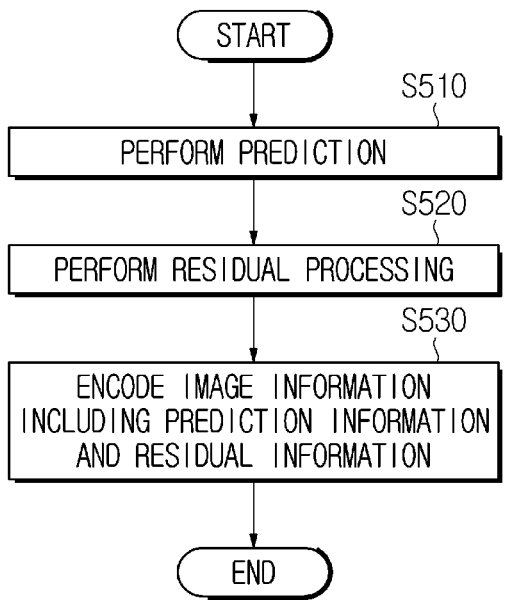
FIG. 5 is a view showing an example of a schematic picture encoding procedure, to which embodiment(s) of the present disclosure is applicable.

FIG. 5 shows an example of a schematic picture encoding procedure, to which embodiment(s) of the present disclosure is applicable.

Each procedure shown in FIG. 5 may be performed by the image encoding apparatus of FIG. 2. For example, step S510 may be performed by the predictors 185 and 180, step S520 may be performed by a residual processor 115, 120 and 130, and step S530 may be performed in the entropy encoder 190. Step S510 may include the inter/intra prediction procedure described in the present disclosure, step S520 may include the residual processing procedure described in the present disclosure, and step S530 may include the information encoding procedure described in the present disclosure.

Referring to FIG. 5, the picture encoding procedure may schematically include not only a procedure for encoding and outputting information for picture reconstruction (e.g., prediction information, residual information, partitioning information, etc.) in the form of a bitstream but also a procedure for generating a reconstructed picture for a current picture and a procedure (optional) for applying in-loop filtering to a reconstructed picture, as described with respect to FIG. 2. The encoding apparatus may derive (modified) residual samples from a quantized transform coefficient through the dequantizer 140 and the inverse transformer 150, and generate the reconstructed picture based on the prediction samples which are output of step S510 and the (modified) residual samples. The reconstructed picture generated in this way may be equal to the reconstructed picture generated in the decoding apparatus. The modified reconstructed picture may be generated through the in-loop filtering procedure for the reconstructed picture. In this case, the modified reconstructed picture may be stored in the decoded picture buffer or a memory 170, and may be used as a reference picture in the inter prediction procedure when encoding the picture later, similarly to the decoding apparatus. As described above, in some cases, some or all of the in-loop filtering procedure may be omitted. When the in-loop filtering procedure is performed, (in-loop) filtering related information (parameter) may be encoded in the entropy encoder 190 and output in the form of a bitstream, and the decoding apparatus may perform the in-loop filtering procedure using the same method as the encoding apparatus based on the filtering related information.

Through such an in-loop filtering procedure, noise occurring during video/image coding, such as blocking artifact and ringing artifact, may be reduced and subjective/objective visual quality may be improved. In addition, by performing the in-loop filtering procedure in both the encoding apparatus and the decoding apparatus, the encoding apparatus and the decoding apparatus may derive the same prediction result, picture coding reliability may be increased and the amount of data to be transmitted for picture coding may be reduced.

As described above, the picture reconstruction procedure may be performed not only in the image decoding apparatus but also in the image encoding apparatus. A reconstructed block may be generated based on intra prediction/inter prediction in units of blocks, and a reconstructed picture including reconstructed blocks may be generated. When a current picture/slice/tile group is an I picture/slice/tile group, blocks included in the current picture/slice/tile group may be reconstructed based on only intra prediction. On the other hand, when the current picture/slice/tile group is a P or B picture/slice/tile group, blocks included in the current picture/slice/tile group may be reconstructed based on intra prediction or inter prediction. In this case, inter prediction may be applied to some blocks in the current picture/slice/tile group and intra prediction may be applied to the remaining blocks. The color component of the picture may include a luma component and a chroma component and the methods and embodiments of the present disclosure are applicable to both the luma component and the chroma component unless explicitly limited in the present disclosure.

Example of Coding Layer Structure

Coded video/image according to the present disclosure may be, for example, processed according to the coding layer and structure described below.

Figure 6:
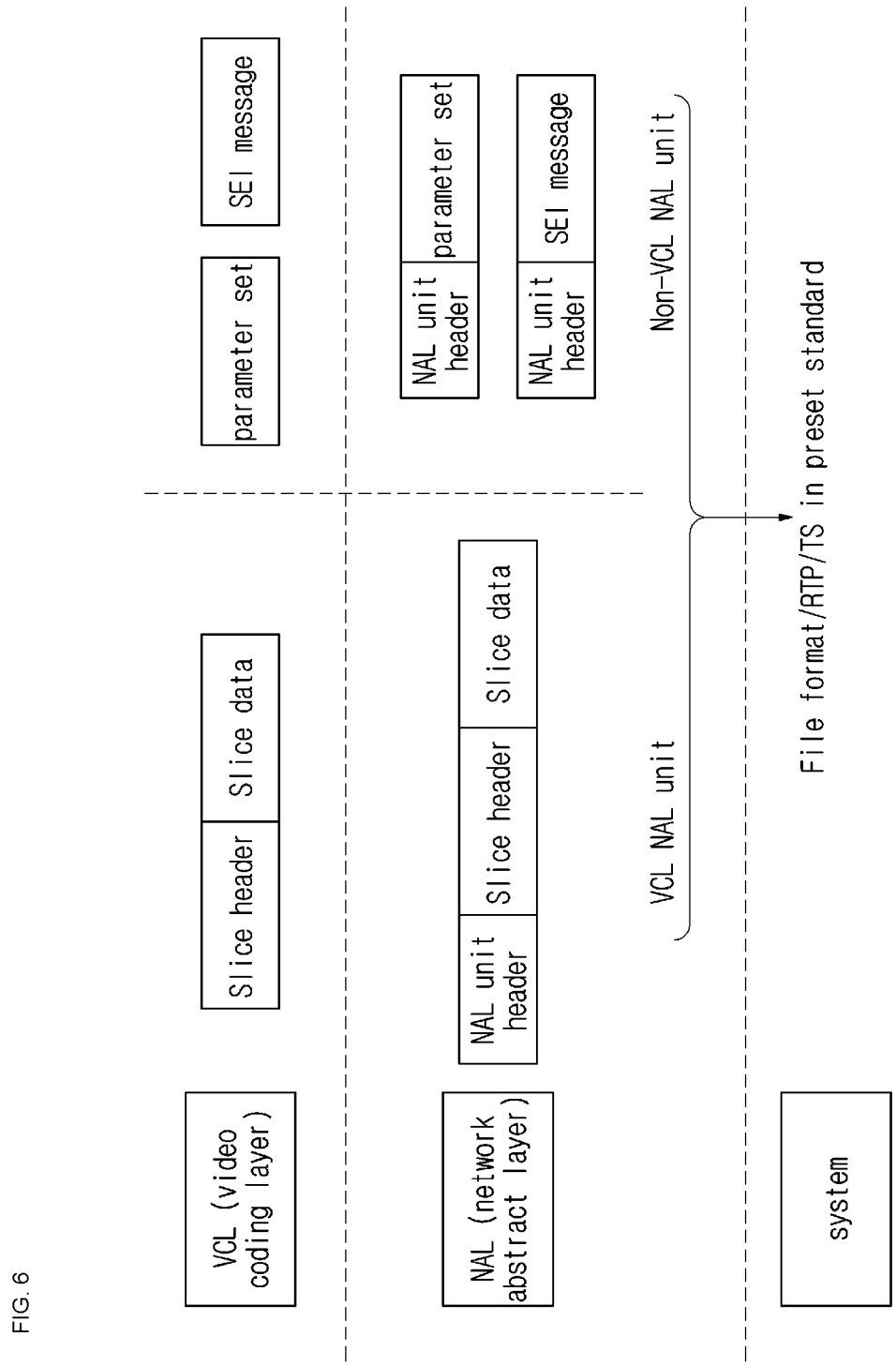
FIG. 6 is a view showing an example of a layer structure for a coded video/image.

FIG. 6 is a view showing a layer structure for a coded image.

The coded image is classified into a video coding layer (VCL) for an image decoding process and handling itself, a lower system for transmitting and storing encoded information, and a network abstraction layer (NAL) present between the VCL and the lower system and responsible for a network adaptation function.

In the VCL, VCL data including compressed image data (slice data) may be generated or a supplemental enhancement information (SEI) message additionally required for a decoding process of an image or a parameter set including information such as a picture parameter set (PPS), a sequence parameter set (SPS) or a video parameter set (VPS) may be generated.

In the NAL, header information (NAL unit header) may be added to a raw byte sequence payload (RBSP) generated in the VCL to generate a NAL unit. In this case, the RBSP refers to slice data, a parameter set, an SEI message generated in the VCL. The NAL unit header may include NAL unit type information specified according to RBSP data included in a corresponding NAL unit.

As shown in FIG. 6, the NAL unit may be classified into a VCL NAL unit and a non-VCL NAL unit according to the RBSP generated in the VCL. The VCL NAL unit may mean a NAL unit including information on an image (slice data), and the Non-VCL NAL unit may mean a NAL unit including information (parameter set or SEI message) required to decode an image.

The VCL NAL unit and the Non-VCL NAL unit may be attached with header information and transmitted through a network according to the data standard of the lower system. For example, the NAL unit may be modified into a data format of a predetermined standard, such as H.266/VVC file format, RTP (Real-time Transport Protocol) or TS (Transport Stream), and transmitted through various networks.

As described above, in the NAL unit, a NAL unit type may be specified according to the RBSP data structure included in the corresponding NAL unit, and information on the NAL unit type may be stored in a NAL unit header and signaled. For example, this may be largely classified into a VCL NAL unit type and a non-VCL NAL unit type depending on whether the NAL unit includes information on an image (slice data). The VCL NAL unit type may be classified according to the property and type of the picture included in the VCL NAL unit, and the Non-VCL NAL unit type may be classified according to the type of a parameter set.

An example of the NAL unit type specified according to the type of the parameter set/information included in the Non-VCL NAL unit type will be listed below.

DCI (Decoding capability information) NAL unit type (NUT): Type for NAL unit including DCI VPS(Video Parameter Set) NUT: Type for NAL unit including VPS SPS(Sequence Parameter Set) NUT: Type for NAL unit including SPS PPS(Picture Parameter Set) NUT: Type for NAL unit including PPS APS (Adaptation Parameter Set) NUT: Type for NAL unit including APS PH (Picture header) NUT: Type for NAL unit including PH The above-described NAL unit types may have syntax information for a NAL unit type, and the syntax information may be stored in a NAL unit header and signaled. For example, the syntax information may be nal_unit_type, and the NAL unit types may be specified using nal_unit_type values.

Meanwhile, as described above, one picture may include a plurality of slices, and one slice may include a slice header and slice data. In this case, one picture header may be further added to a plurality of slices (slice header and slice data set) in one picture. The picture header (picture header syntax) may include information/parameters commonly applicable to the picture. The slice header (slice header syntax) may include information/parameters commonly applicable to the slice. The APS (APS syntax) or PPS (PPS syntax) may include information/parameters commonly applicable to one or more slices or pictures. The SPS (SPS syntax) may include information/parameters commonly applicable to one or more sequences. The VPS (VPS syntax) may information/parameters commonly applicable to multiple layers. The DCI (DCI syntax) may include information/parameters related to decoding capability.

In the present disclosure, a high level syntax (HLS) may include at least one of the APS syntax, the PPS syntax, the SPS syntax, the VPS syntax, the DCI syntax, the picture header syntax or the slice header syntax. In addition, in the present disclosure, a low level syntax (LLS) may include, for example, a slice data syntax, a CTU syntax, a coding unit syntax, a transform unit syntax, etc.

Meanwhile, in the present disclosure, video/image information encoded in the encoding apparatus and signaled to the decoding apparatus in the form of a bitstream may include not only in-picture partitioning related information, intra/inter prediction information, residual information, in-loop filtering information but also information on the slice header, information on the picture header, information on the APS, information on the PPS, information on the SPS, information on the VPS and/or information on the DCI. In addition, the video/image information may further include general constraint information and/or information on a NAL unit header.

High Level Syntax Signaling and Semantics

As described above, video/image information according to the present disclosure may include a high level syntax (HLS). An image encoding method and/or an image decoding method may be performed based on the video/image information.

The present disclosure includes various configurations for improving signaling of a high level syntax.

Configuration 1: When reference picture resampling (RPR) is not enabled, it may be constrained that the picture sizes of all pictures within a CLVS (Coder Layer Video Sequence) shall be the same. In the present disclosure, RPR may, for example, mean that the sizes of a reference picture and a current picture are different and thus the reference picture is scaled. In addition, the CLVS may be understood as video/image information or a bitstream including a sequence of encoded pictures belonging to the same layer. More specifically, when RPR is not enabled, it may be constrained that picture sizes (i.e., pic_width_in_luma_samples and pic_height_in_luma_samples) signaled in all PPSs referring to the same SPS shall be the same. In the present disclosure, pic_width_in_luma_samples and pic_height_in_luma_samples may mean the picture width in a luma sample unit and the picture height in a luma sample unit, respectively.

Configuration 2: When a picture with nuh_layer_id equal to layerA refers to a parameter set with nuh_layer_id equal to layerB, and layerA and layerB are different, it may be constrained that layerB shall be a direct reference layer or indirect reference layer of layerA. In the present disclosure, nuh_layer_id may mean the identifier of a layer, to which a NAL unit belongs, or the identifier of a layer, to which a NAL unit for transmitting a parameter set applies.

Configuration 3: When RPR is not allowed, nuh_layer_id of the PPS and nuh_layer_id of the SPS referred by the PPS are the same, and sps_video_parameter_set_id is equal to 0, it may be constrained that pic_width_in_luma_samples and pic_width_in_luma_samples signaled in all PPSs in the CLVS shall be the same as pic_width_max_in_luma_samples and pic_height_max_in_luma_samples, respectively. In the present disclosure, pic_width_max_in_luma_samples and pic_height_max_in_luma_samples may mean a maximum picture width in a luma sample unit and a maximum picture height in a luma sample unit, respectively. In addition, in the present disclosure, sps_video_parameter_set_id may be an identifier for a video parameter set (VPS) referred to by the SPS. As described above, the VPS includes information/parameters commonly applicable to multiple layers. In addition, sps_video_parameter_set_id being equal to 0 may mean that the SPS does not refer to the VPS. Accordingly, sps_video_parameter_set_id being equal to 0 may mean that a sequence referring to the SPS is composed of a single layer, not multiple layers.

Configuration 4: Alternatively, when RPR is not allowed, nuh_layer_id of the PPS and nuh_layer_id of the SPS referred to by the PPS are the same and the layer is not referred to by any other layer, it may be constrained that pic_width_in_luma_samples and pic_width_in_luma_samples signalled in all PPSs in the CLVS are the same as pic_width_max_in_luma_samples and pic_height_max_in_luma_samples, respectively.

Configuration 5: Alternatively, when RPR is not allowed, it may be constrained that there shall be at least one PPS referring to the SPS with pic_width_in_luma_samples and pic_width_in_luma_samples equal to pic_width_max_in_luma_samples and pic_height_max_in_luma_samples, respectively.

Configuration 6: As general constraint information, a constraint flag for LMCS may be signaled. For example, no_lmcs_constraint_flag may be signalled through a general_constraint_info( ) syntax structure. no_lmcs_constraint_flag may constrain application of LMCS. For example, no_lmcs_constraint_flag may specify whether sps_lmcs_enabled_flag has a value of 0. In the present disclosure, LMCS may be the term collectively referring to a luma mapping process and a chroma scaling process. For example, the luma mapping process and/or the chroma scaling process may be performed before in-loop filtering. For example, the luma mapping process may be performed with respect to a prediction block of a current luma block to generate a prediction block having a changed dynamic range. In this case, the current luma block may be reconstructed based on the prediction block having the changed dynamic range. In addition, for example, the chroma scaling process may be a process of scaling a chroma component residual signal based on a relationship between a luma component signal and a chroma component signal. In this case, the current chroma block may be reconstructed based on the scaled chroma component residual signal.

The embodiment of the present disclosure may include at least one of the above-described configurations. The above-described configurations may be applicable individually or in combinations.

Hereinafter, embodiments of the present disclosure including at least one of the above-described configurations will be described.

According to an embodiment of the present disclosure, constraints on a syntax element sps_seq_parameter_set_id in a sequence parameter set (SPS) may be modified. sps_seq_parameter_set_id may provide an identifier for the SPS for reference by other syntax elements. SPS NAL units may share the same value space of sps_seq_parameter_set_id, regardless of nuh_layer_id values.

According to the present embodiment, when the value of nuh_layer_id of a particular SPS NAL unit is spsLayerId and the value of nuh_layer_id of a particular VCL NAL unit is vclLayerId, it may be constrained that the particular VCL NAL unit shall not refer to the particular SPS NAL unit unless one of the following conditions (Condition 1 and Condition 2) is satisfied.

Condition 1: spsLayerId is equal to vclLayerId

Condition 2: DependencyFlag[vclLayerId][spsLayerId] is equal to 1

In the present disclosure, DependencyFlag[i][j] may indicate whether a layer with an index j is a (direct or indirect) reference layer of a layer with index i. For example, DependencyFlag[i][j] equal to a first value (e.g., 0) may indicate that the layer with the index j is not the reference layer of the layer with the index i. In addition, DependencyFlag[i][j]

equal to a second value (e.g., 1) may indicate that the layer with the index j is the reference layer of the layer with the index i.

According to another embodiment of the present disclosure, constraints on a syntax element pps_pic_parameter_set_id in a picture parameter set (PPS) may be modified. pps_pic_parameter_set_id may provide an identifier for the PPS for reference by other syntax elements. PPS NAL units may share the same value space of pps_pic_parameter_set_id, regardless of a nuh_layer_id value.

According to the present embodiment, when the value of nuh_layer_id of a particular PPS NAL unit is ppsLayerId and the value of nuh_layer_id of a particular VCL NAL unit is vclLayerId, it may be constrained that the particular VCL NAL unit shall not refer to the particular PPS NAL unit unless one of the following conditions (Condition 3 and Condition 4) is satisfied.

Condition 3: ppsLayerId is equal to vclLayerId
Condition 4: DependencyFlag[vclLayerId][ppsLayerId] is equal to 1

According to another embodiment of the present disclosure, constraints on a syntax element adaptation_parameter_set_id in an adaptation parameter set (APS) may be modified. adaptation_parameter_set_id may provide an identifier for the APS for reference by other syntax elements.

According to the present embodiment, when the value of nuh_layer_id of a particular APS NAL unit is apsLayerId and the value of nuh_layer_id of a particular VCL NAL unit is vclLayerId, the particular VCL NAL unit shall not refer to the particular APS NAL unit unless one of the following conditions (Condition 5 and Condition 6) is satisfied.

Condition 5: apsLayerId is equal to vclLayerId
Condition 6: DependencyFlag[vclLayerId][apsLayerId] is equal to 1

According to another embodiment of the present disclosure, constraints on a syntax element pic_width_in_luma_samples and a syntax element pic_height_in_luma_samples in the PPS may be modified. pic_width_in_luma_samples may indicate a luma sample unit width of a decoded picture referring to the PPS. pic_width_in_luma_samples may not be greater than pic_width_max_in_luma_samples. In addition, pic_height_in_luma_samples may indicate a luma sample unit height of a decoded picture referring to the PPS. pic_height_in_luma_samples may not be greater than pic_height_max_in_luma_samples.

According to the present embodiment, when res_change_in_clvs_allowed_flag is equal to 0, it may be constrained that the value of pic_width_in_luma_samples and the value of pic_height_in_luma_samples are the same for all PPSs referred to by encoded pictures in the CLVS (first constraint). In the present disclosure, res_change_in_clvs_allowed_flag may be information indicating whether RPR is allowed. For example, res_change_in_clvs_allowed_flag equal to a first value (e.g., 0) may indicate that RPR is not allowed. In addition, res_change_in_clvs_allowed_flag equal to a second value (e.g., 1) may indicate that RPR is allowed.

In addition, according to the present embodiment, when res_change_in_clvs_allowed_flag is equal to 0 and sps_video_parameter_set_id is equal to 0, it may be constrained that the value of pic_width_in_luma_samples is equal to the value of pic_width_max_in_luma_samples, and the value of pic_height_in_luma_samples is equal to the value of pic_height_max_in_luma_samples (second constraint).

According to the present embodiment, the first constraint and the second constraint may be independently or in combination.

According to another embodiment of the present disclosure, information indicating whether to constrain LMCS may be signaled as general constraint information.

Figures 7, 8:
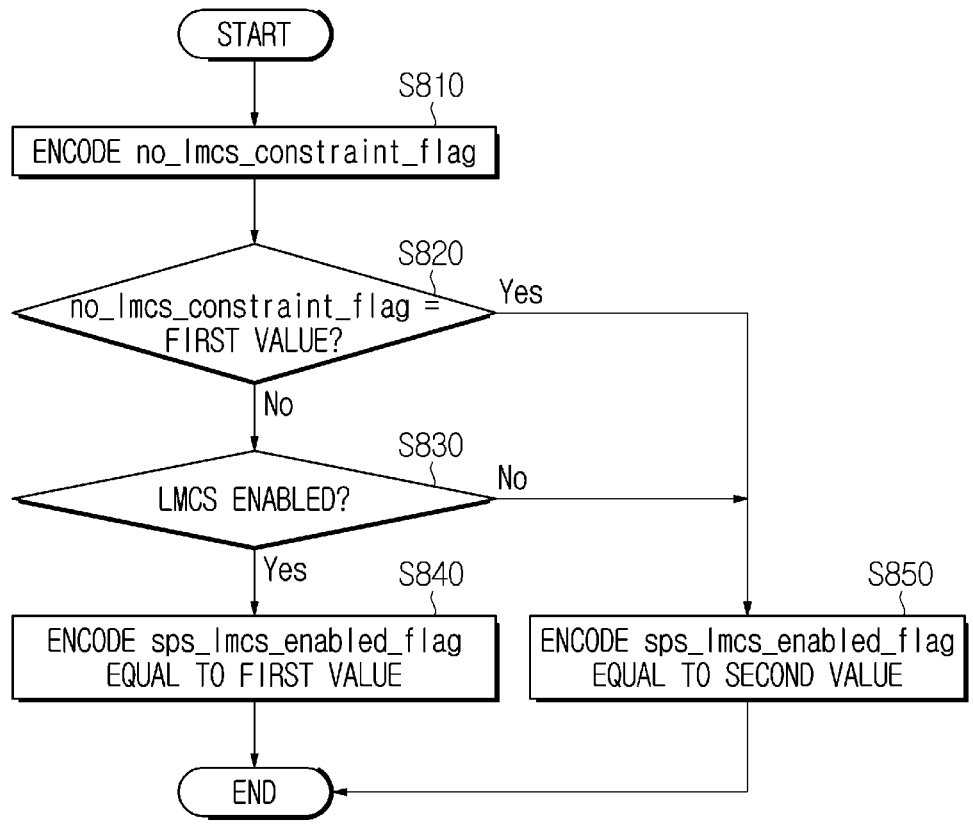
FIG. 7 is a view showing an example of a syntax structure for signaling information indicating whether to constrain LMCS as general constraint information.
FIG. 8 is a view illustrating operation of an image encoding apparatus according to an embodiment described with reference to FIG. 7.

FIG. 7 is a view showing an example of a syntax structure for signaling information indicating whether to constrain LMCS as general constraint information.

As shown in FIG. 7, for example, no_lmcs_constraint_flag may be transmitted as information indicating whether to constrain LMCS. In this case, information indicating whether to constrain LMCS may be included and signaled in a general_constraint_info( ) syntax structure for signaling general constraint information.

According to the present embodiment, no_lmcs_constraint_flag equal to a first value (e.g., 1) may constrain sps_lmcs_enabled_flag to have a value of 0. In addition, no_lmcs_constraint_flag equal to a second value (e.g., 0) may mean that the constraint is not imposed. In the above, sps_lmcs_enabled_flag is information signaled at a higher level (e.g., SPS) and may be an example of information indicating whether LMCS is enabled. For example, sps_lmcs_enabled_flag equal to a first value (e.g., 1) may indicate that LMCS is enabled for the current CLVS, and sps_lmcs_enabled_flag equal to a second value (e.g., 0) may indicate that LMCS is not enabled for the current CLVS. When LMCS is enabled, information related to LMCS may be additionally signaled. When LMCS is not enabled, signaling of information related to LMCS may be omitted.

As described above, general constraint information may be included and signaled in a general_constraint_info( ) syntax structure. The general_constraint_info( ) syntax structure may be present in a profile tier level (PTL) structure, and may provide information on additional constraints or limits for a particular profile, tier and level.

FIG. 8 is a view illustrating operation of an image encoding apparatus according to an embodiment described with reference to FIG. 7.

The image encoding apparatus may encode no_lmcs_constraint_flag (S810), after determining whether to constrain LMCS. When LMCS is constrained, the image encoding apparatus may encode no_lmcs_constraint_flag equal to a first value (e.g., 1). Alternatively, when LMCS is not constrained, the image encoding apparatus may encode no_lmcs_constraint_flag equal to a second value (e.g., 0). The image encoding apparatus may encode no_lmcs_constraint_flag in a general_constraint_info( ) syntax structure as general constraint information. For example, the image encoding apparatus may be configured to constrain LMCS through signaling of no_lmcs_constraint_flag even when a current profile, tier and level allows LMCS. Therefore, it is possible to configure more various encoding environments.

The image encoding apparatus may determine the value of no_lmcs_constraint_flag (S820), and determine whether LMCS is enabled for current LMCS (S830) when the value is a second value (e.g., 0) (S820—No). When LMCS is enabled for the current CVLS (S830—Yes), the image encoding apparatus may encode sps_lmcs_enabled_flag equal to a first value (e.g., 1) (S840). When the value of no_lmcs_constraint_flag is equal to a first value (e.g., 1) (S820—Yes) or when LMCS is not enabled for the current CLVS (S830—No), the image encoding apparatus may encode sps_lmcs_enabled_flag equal to a second value (e.g., 0) (S850). The image encoding apparatus may encode sps_lmcs_enabled_flag in the SPS, for example.

When sps_lmcs_enabled_flag has a first value (e.g., 1), the image encoding apparatus may encode additional information related to LMCS (not shown). When sps_lmcs_enabled_flag has a second value (e.g., 0), the image encoding apparatus may omit signaling of additional information related to LMCS (not shown). The image encoding apparatus may perform encoding/decoding of a current picture included in a current sequence, by performing or not performing LMCS based on sps_lmcs_enabled_flag and/or additional information related to LMCS.

Figures 9, 10:
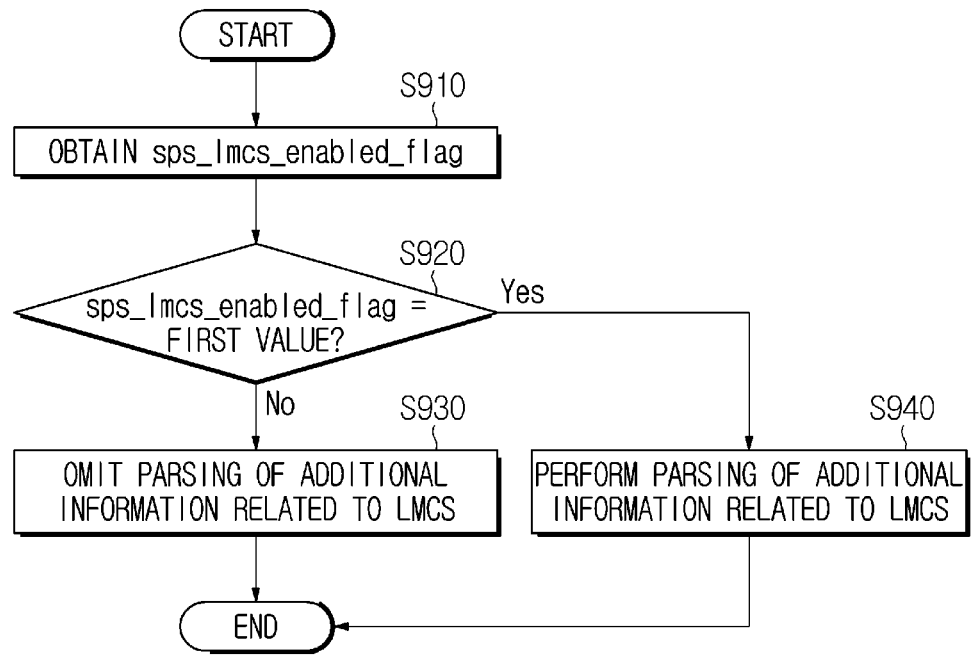
FIG. 9 is a view illustrating operation of an image decoding apparatus according to an embodiment described with reference to FIG. 7.
FIG. 10 is a view illustrating an example of additional information signaled in relation to LMCS.

FIG. 9 is a view illustrating operation of an image decoding apparatus according to an embodiment described with reference to FIG. 7.

The image decoding apparatus may obtain sps_lmcs_enabled_flag from a bitstream (S910). For example, the image decoding apparatus may obtain sps_lmcs_enabled_flag from an SPS and decode the same. In this case, sps_lmcs_enabled_flag may be encoded by the method described with reference to FIG. 8.

The image decoding apparatus may determine whether sps_lmcs_enabled_flag is equal to a first value (e.g., 1) (S920). When sps_lmcs_enabled_flag is equal to a first value (e.g., 1) (S920—Yes), the image decoding apparatus may obtain additional information related to LMCS from a bitstream (S940). In this case, the image decoding apparatus may reconstruct a current picture by performing LMCS based on information obtained in relation to LMCS (not shown). When sps_lmcs_enabled_flag is equal to a second value (e.g., 0) (S920—No), the image decoding apparatus may omit parsing of additional information related to LMCS (S930). In this case, the image decoding apparatus may reconstruct a current picture without performing LMCS (not shown).

sps_lmcs_enabled_flag received by the image decoding apparatus is encoded by the method described with reference to FIG. 8. That is, the image decoding apparatus receives sps_lmcs_enabled_flag encoded by the image encoding apparatus based on no_lmcs_constraint_flag. Accordingly, the image decoding apparatus may obtain sps_lmcs_enabled_flag encoded with an accurate value according to the present disclosure without determining whether no_lmcs_constraint_flag is equal to a first value (e.g., 1).

However, operation of the image decoding apparatus is not limited to the above example, and the image decoding apparatus may infer the value of sps_lmcs_enabled_flag based on no_lmcs_constraint_flag. For example, the image decoding apparatus may infer sps_lmcs_enabled_flag to be a second value (e.g., 0) when the value of no_lmcs_constraint_flag is equal to a first value (e.g., 1).

In addition, although not shown in FIG. 9, the image decoding apparatus may obtain no_lmcs_constraint_flag from a bitstream. The image decoding apparatus may infer sps_lmcs_enabled_flag based on the obtained no_lmcs_constraint_flag as described above, and may efficiently perform initialization of the apparatus by including activation/deactivation of an LMCS related module. For example, the image decoding apparatus may initialize the apparatus to constrain LMCS based on no_lmcs_constraint_flag, even when a current profile, tier and level allows LMCS. Therefore, it is possible to configure more various decoding environments.

FIG. 10 is a view illustrating an example of additional information signaled in relation to LMCS.

As shown in FIG. 10, when sps_lmcs_enabled_flag is equal to a first value (e.g., 1), information such as ph_lmcs_enabled_flag, ph_lmcs_aps_id, ph_chroma_residual_scale_flag, etc. may be signaled in a picture header syntax structure, as additional information related to LMCS.

ph_lmcs_enabled_flag may be information indicating whether LMCS is enabled for a current picture. For example, ph_lmcs_enabled_flag equal to a first value (e.g., 1) may indicate that LMCS is enabled for a current picture. In addition, ph_lmcs_enabled_flag equal to a second value (e.g., 0) may indicate that LMCS is not enabled for a current picture.

ph_lmcs_aps_id may be signaled when ph_lmcs_enabled_flag is equal to a first value (e.g., 1). ph_lmcs_aps_id may indicate an identifier of an APS related to LMCS referred to by a current picture.

ph_chroma_residual_scale_flag may be signaled when ph_lmcs_enabled_flag is equal to a first value (e.g., 1) and a chroma component is present in a picture (ChromaArrayType !=0). ph_chroma_residual_scale_flag may be information indicating whether a chroma scaling process is enabled for a current picture. For example, ph_chroma_residual_scale_flag equal to a first value (e.g., 1) may indicate that a chroma scaling process is enabled for a current picture. In addition, ph_chroma_residual_scale_flag equal to a second value (e.g., 0) may indicate that a chroma scaling process is not enabled for a current picture.

Additional information related to LMCS following sps_lmcs_enabled_flag equal to a first value (e.g., 1) is not limited to the example described with reference to FIG. 10. For example, in addition to the information described with reference to FIG. 10, other information may be signaled as additional information related to LMCS. In addition, a syntax structure in which additional information related to LMCS is signaled is also not limited to a picture header syntax structure, and, for example, may be signaled through a high level syntax structure such as a PPS or a slice header.

According to the embodiments described with reference to FIGS. 7 to 10, when no_lmcs_constraint_flag is equal to a first value (e.g., 1), although LMCS is allowed for the profile, the image decoding apparatus may know that an LMCS tool is not used for a current bitstream or CVS. Accordingly, the image decoding apparatus, which has received no_lmcs_constraint_flag equal to a first value (e.g., 1), may adjust initialization/configuration of the apparatus. For example, the image decoding apparatus may be initialized not to activate a module for LMCS.

According to the embodiments described with reference to FIGS. 7 to 10, the image encoding apparatus may signal whether to constrain LMCS for a current bitstream by transmitting no_lmcs_constraint_flag, and the image decoding apparatus may determine whether to constrain LMCS for a current bitstream by parsing no_lmcs_constraint_flag. That is, by signaling information indicating whether to constrain LMCS as general constraint information, the image encoding apparatus and/or the image decoding apparatus may more rapidly perform initialization of the apparatus and configure various encoding/decoding environments.

As described above, the general constraint information may be included and transmitted in a PTL syntax structure, and, generally, the PTL syntax structure may be present in a DCI or SPS. When no_lmcs_constraint_flag is present in a PTL within DCI, no_lmcs_constraint_flag is applicable as a constraint for the entire bitstream. In contrast, when no_lmcs_constraint_flag is present in a PTL within an SPS, no_lmcs_constraint_flag is applicable as a constraint for pictures in the CVS associated with the SPS. That is, by adjusting a location (DCI or SPS) where the general constraint information is transmitted, a range, to which the constraints for LMCS applies based on the value of no_lmcs_constraint_flag, may be adaptively set.

According to the embodiments described with reference to FIGS. 7 to 10, by transmitting no_lmcs_constraint_flag as general constraint information, it is possible to adjust a location where general constraint information is signaled and thus it is possible to adaptively select a range, to which the constraints apply. Accordingly, it is possible to perform more accurate and efficient signaling.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 11:
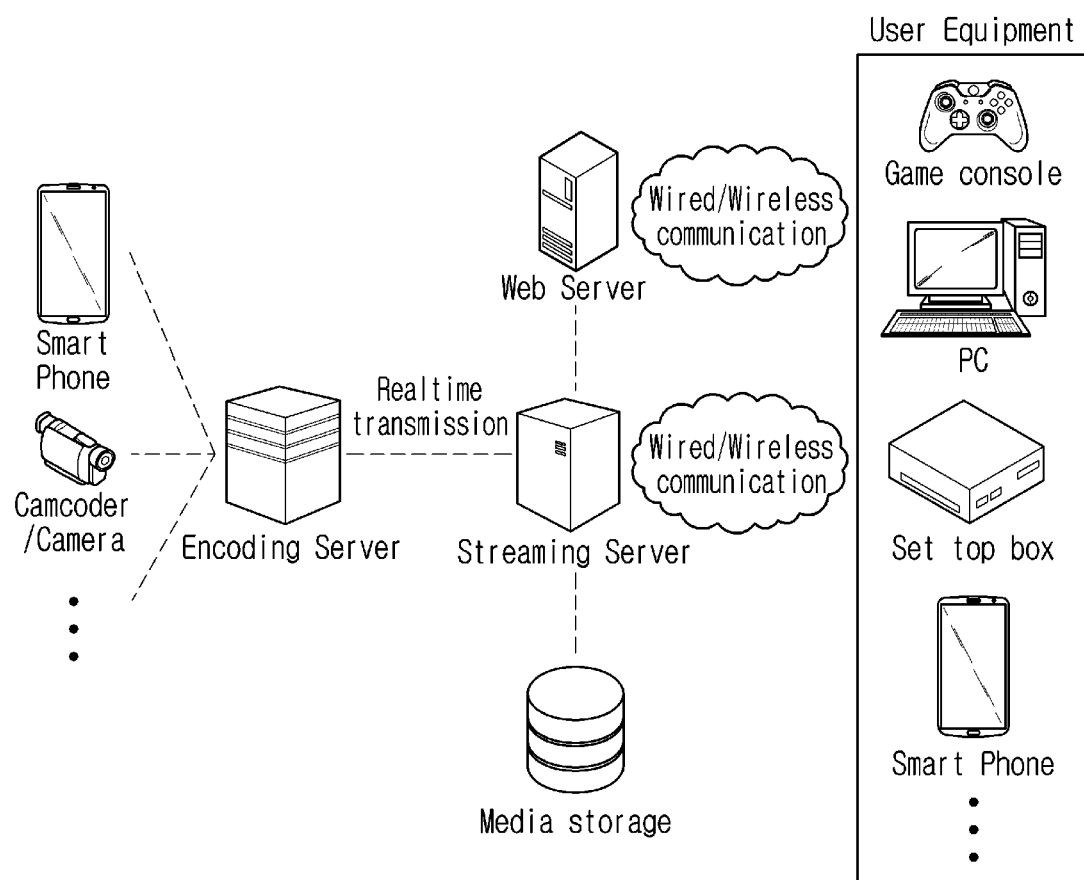
FIG. 11 is a view showing a content streaming system, to which an embodiment of the present disclosure is applicable.

FIG. 11 is a view showing a content streaming system, to which an embodiment of the present disclosure is applicable.

As shown in FIG. 11, the content streaming system, to which the present disclosure is applied, may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

The invention claimed is:

1. An image decoding method performed by an image decoding apparatus, the image decoding method comprising:
obtaining, from a bitstream, a first syntax element specifying whether to constrain luma mapping with chroma scaling (LMCS);
obtaining, from the bitstream, a second syntax element specifying whether LMCS for a current video sequence is allowed; and
reconstructing a current picture within the current video sequence based on the second syntax element, wherein the second syntax element is parsed from the bitstream independently of the first syntax element, and wherein a value of the second syntax element is determined based on a value of the first syntax element.

2. An image encoding method performed by an image encoding apparatus, the image encoding method comprises:

encoding, into a bitstream, a first syntax element specifying whether to constrain mapping with chroma scaling (LMCS);

encoding, into the bitstream, a second syntax element specifying whether LMCS for a current video sequence is allowed; and encoding a current picture within the current video sequence based on the second syntax element, wherein the second syntax element is included into the bitstream independently of the first syntax element, and whether a value of the second syntax element is determined based on a value of the first syntax element.

3. A non-transitory computer-readable recording medium storing the bitstream generated by the image encoding method of claim 2.

* * * * *

UNITED STATES PATENT AND TRADEMARK OFFICE
CERTIFICATE OF CORRECTION

PATENT NO. : 11,956,443 B2
APPLICATION NO. : 17/916452
DATED : April 9, 2024
INVENTOR(S) : Hendry Hendry et al.

It is certified that error appears in the above-identified patent and that said Letters Patent is hereby corrected as shown below:

In the Claims

Column 25, Lines 8-9, of Claim 2, replace "whether to constrain mapping with chroma scaling (LMCS);" with --whether to constrain luma mapping with chroma scaling (LMCS);--.

Signed and Sealed this
Fourth Day of June, 2024

Katherine Kelly Vidal
*Director of the United States Patent and Trademark Office*